United States Patent [19]

Bertelli et al.

[11] 4,203,882
[45] May 20, 1980

[54] SELF-EXTINGUISHING POLYMERIC COMPOSITIONS BASED ON MODIFIED POLYPROPYLENE

[75] Inventors: Guido Bertelli; Pierpaolo Roma; Renato Locatelli, all of Ferrara, Italy

[73] Assignee: Montedison S.p.A., Milan, Italy

[21] Appl. No.: 954,206

[22] Filed: Oct. 24, 1978

[30] Foreign Application Priority Data

Oct. 27, 1977 [IT] Italy .................. 29042 A/77

[51] Int. Cl.$^2$ ............................................. C08L 91/00
[52] U.S. Cl. .................. 260/28.5 A; 260/45.75 B; 260/45.8 NT
[58] Field of Search ............ 260/28.5 A, 45.75 B, 260/45.8 NT

[56] References Cited

U.S. PATENT DOCUMENTS

| | | | |
|---|---|---|---|
| 3,629,368 | 12/1971 | Fukuda et al. | 260/878 R |
| 4,010,139 | 3/1977 | Bertelli et al. | 260/28.5 A |

*Primary Examiner*—Melvyn I. Marquis
*Attorney, Agent, or Firm*—Morgan, Finnegan, Pine, Foley & Lee

[57] ABSTRACT

The invention concerns impact resistant polymeric compositions having flame-resistance properties and comprising:

(1) a blend of (a) 95–80% by weight of a thermoplastic block propylene-ethylene copolymer containing from 3 to 20% by weight of copolymerized ethylene, and
   (b) 5–20% by weight of an elastomeric ethylene-propylene copolymer containing from 50 to 70% by weight of copolymerized ethylene;
(2) 0.5–5% of basic bismuth carbonate $(BiO)_2CO_3$;
(3) 0.3–1.3% of a triazine compound selected from the group consisting of melamine, ammeline, ammelide, acetoguanamine, benzoguanamine and isocyanuric acid;
(4) 2–10% of a chlorinated paraffin wax; and
(5) 0.5–10% of a bromine containing organic compound selected from the group consisting of decabromodiphenyl oxide, octabromodiphenyl oxide, pentabromodiphenyl oxide, 1,2-bis(2.4.6-tribromophenoxy)ethane, pentabromophenol, pentabromotoluene and ethyl-pentabromobenzene;

all percentages of anti-flame additives being referred to the total weight of the composition.

The foregoing compositions are useful in the manufacture of motor vehicles.

5 Claims, No Drawings

SELF-EXTINGUISHING POLYMERIC COMPOSITIONS BASED ON MODIFIED POLYPROPYLENE

BACKGROUND OF THE PRIOR ART

In U.S. Pat. No. 4,010,139 there are described polyolefinic compositions, suited for the manufacture of self-extinguishing articles, comprising:

(1) polypropylene;

(2) a mixture of (a) basic bismuth carbonate $(BiO)_2CO_3$ and (b) a chlorinated paraffin wax; component (a) being present in such an amount as to have a bismuth content in the composition comprised between 0.5 and 5% by weight, and component (b) being present in an amount comprised between 1% and 10% by weight of the composition.

Compositions of this type, comprising 5% of a chlorinated paraffin wax at 70% of Cl and 1.65% of $(BiO)_2CO_3$ (corresponding to 1.35% of Bi metal), display excellent flame resistance characteristics which correspond to an oxygen index equal to 29 (the oxygen index expresses the minimum oxygen percentage in an oxygen/nitrogen mixture, necessary for a test piece to burn in a continuous way).

In U.S. patent application Ser. No. 821,844 filed Aug. 4, 1977 there are described bumpers for motor vehicles, manufactured from an intimate mixture of (a) 95–80% by weight of a thermoplastic block copolymer propylene-ethylene containing from 3% to 20% by weight of copolymerized ethylene and having a flow index, measured at 230° C. according to ASTM D 1238 condition L standards; comprised between 0.2 and 1, and an elasticity modulus at 23° C., measured according to ASTM D 790 standards, of at least 1100 $MN/m^2$;

(b) from 5 to 20% by weight of an ethylene-propylene elastomeric copolymer containing 50–70% by weight of copolymerized ethylene and having a Mooney viscosity ML (1+4) at 100° C. comprised between 50 and 100;

(c) possibly inert, powder mineral fillers.

By the term "thermoplastic block copolymers" are meant those polymeric products which are obtained by polymerizing propylene in the presence of Ziegler-Natta catalysts, which polymerization is successively continued with the addition of ethylene or ethylene-/propylene mixtures; said polymeric products are briefly described as "polypropylene modified with small percentages of copolymerized ethylene", and may be prepared according to processes described, for instance, in British Pat. No. 915,622 and in U.S. Pat. No. 3,629,368.

With the above described polymeric compositions it is possible to manufacture bumpers for motor vehicles having an elasticity modulus sufficiently high throughout a wide temperature range, particularly from $-30°$ C. to $+60°$ C., and displaying a high resistance to embrittlement at low temperatures and, consequently, a better impact resistance.

In order to impart to said shock resistant polymeric compositions flame-resistant properties, into those compositions there were incorporated the same additives already used with success in the case of polypropylene and which have been previously described. The result was that, while the anti-impact properties of the compositions remain unaltered, the self-extinguishing characteristics attain a level more or less inferior to that which is attained incorporating the additives into the pure polypropylene.

From TABLE I it is possible to see that the oxygen index of shock resistant compositions decreases as the percentage of ethylene-propylene elastomer present in the mixture increases; with a percentage of 20% of elastomer, the oxygen index drops to a value of 23. From that same Table it will also be learned that the oxygen index is further reduced when using greater amounts of the two additives.

In the tests recorded on Table I, as thermoplastic block copolymer, there was used a propylene-ethylene copolymer containing 7% by weight of copolymerized ethylene and having a flow index, measured as already indicated, equal to 1.

The elastomer added to said copolymer in ever increasing amounts is an elastomeric ethylene-propylene copolymer containing 55% by weight of copolymerized ethylene and having a Mooney viscosity ML (1+4) at 100° C., equal to 89.

For sake of shortness, a mixture of the thermoplastic copolymer with elastomer, having a certain content of the latter, was simply indicated by the term "blend".

In order to prepare the mixtures indicated on the tables, the thermoplastic copolymer and the elastomer are mixed together in the molten state, preferably in the presence of antioxidants and/or thermal stabilizers, using the methods and equipments conventionally used in the processing of polyolefinic plastic materials, such as for instance wormscrew mixers or rotary mixers of the Banbury type, suited for producing perfectly homogeneous blends.

To the molten mass are added the various additives and the mix thus obtained is extruded in a suitable extruder and converted to granules.

With the granular product 3 mm thick plates are molded on a small CARVER type plate press, operating for 7 minutes at 200° C. and at a pressure of 40 kg/sq.cm.

On the plates thus prepared, it is possible to determine the oxygen index and possibly other properties, such as for instance the glass transition temperature (Tg).

TABLE I

| COMPONENTS | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Polypropylene | 100 | 93.95 | 92.85 | — | — | — | — | — | — | — | — |
| Block thermoplastic copolymer | — | — | — | 100 | 93.35 | 92.85 | — | — | — | — | — |
| Blend at 5% of elastomer | — | — | — | — | — | — | 92.85 | — | — | — | — |
| Blend at 10% of elastomer | — | — | — | — | — | — | — | 92.85 | — | — | — |
| Blend at 15% of elastomer | — | — | — | — | — | — | — | — | 92.85 | — | — |
| Blend at 20% of elastomer | — | — | — | — | — | — | — | — | — | 92.85 | — |
| Blend at 17.5% of elastomer | — | — | — | — | — | — | — | — | — | — | 79.5 |
| $(BiO)_2CO_3$ | — | 1.65 | 1.65 | — | 1.65 | 1.65 | 1.65 | 1.65 | 1.65 | 1.65 | 5 |
| "Cereclor 70"* | — | 5 | 5 | — | 5 | 5 | 5 | 5 | 5 | 5 | 15 |
| "Irgastab T 290"** | — | — | 0.5 | — | — | 0.5 | 0.5 | 0.5 | 0.5 | 0.5 | 0.5 |
| Glass transition tempera- | | | | | | | | | | | |

TABLE I-continued

| COMPONENTS | Parts by Weight | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| ture (Tg)[1] | — | — | — | — | — | — | −10° C. | −26° C. | −40° C. | −50° C. | −30° C. |
| Oxygen Index[2] | 17 | 29 | 28 | 17 | 27 | 26.5 | 26 | 25 | 24.5 | 23 | 22 |

*Chlorinated paraffin wax at 70% of Cl (ICI)
**Dibutyl tin maleate
[1]Measurement carried out according to BS 2782-306B standards
[2]Measurements carried out according to ASTM D-2863 standards

OBJECTS OF THIS INVENTION

An object of this invention is to impart improved flame resistance to the hereinbefore described thermoplastic copolymer and elastomer composition.

Another object of this invention is to provide improved motorvehicle bumpers made from the compositions referred to in the foregoing abstract.

Other objects will be apparent from the discussion which follows:

GENERAL DESCRIPTION OF THE INVENTION

It has now been found that to the blends of thermoplastic copolymer and elastomer as described earlier, there may be imparted considerable levels of flame resistance by the addition of a particular synergistic combination of four additives, that is, basic bismuth carbonate $(BiO)_2CO_3$, a triazine compound, a chlorinated paraffin wax and a brominated organic compound.

More particularly the polymeric uninflammable and impact-resistant compositions of this invention comprise the following essential components, besides the other possible additives normally used in the techniques of this field:

(1) a blend consisting of (a) 95–80% b.w. of a thermoplastic block-copolymer propylene-ethylene containing from 3% to 20% by weight of copolymerized ethylene and having a flow index, measured at 230° C. according to ASTM D-1238 condition L standards, comprised between 0.2 and 1, and an elasticity modulus at 23° C., measured according to ASTM D 790 standards of at least 1100 $MN/m^2$, and (b) 5–20% b.w. of an ethylene-propylene elastomeric copolymer containing from 50 to 70% by weight of copolymerized ethylene, and having a Mooney viscosity ML (1+4) at 100° C. comprised between 50 and 100;

(2) from 0.5 to 5% b.w. of basic bismuth carbonate $(BiO)_2CO_3$;

(3) from 0.3 to 1.3% of a triazine compound chosen from amongst melamine, ammeline, ammelide, acetoguanamine, benzoguanamine and isocyanuric acid;

(4) from 2 to 10% of a chlorinated paraffin wax containing from 40% to 70% by weight of chlorine; and (5) from 0.5 to 10% of brominated organic compound chosen from amongst decabromodiphenyl oxide, octabromodiphenyl oxide, pentabromodiphenyl oxide, 1,2-bis(2,4,6-tribromophenoxy)ethane, pentabromophenol, pentabromotoluene and ethylpentabromobenzene; the total quantity of the two halogenated additives ranging from 5% to 15% and all the percentages of the anitflame additives being referred to the total weight of the composition.

The acetoguanamine and the benzoguanamine mentioned above are respectively the compounds of the formulae:

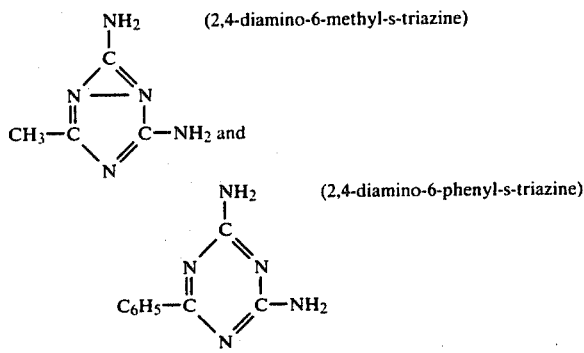

SPECIFIC DESCRIPTION OF THE INVENTION

As specified above, the preferred quantities of $(BiO)_2CO_3$ are those ranging from 0.9 to 1.7%; but the best results are obtained when $(BiO)_2CO_3$ and the triazine compound are used in the ponderal ratio of 1:1, as may be seen on Table II.

In the tests reported on that table, and in the successive tests, the components of the "blend at 20% of elastomer" are the same as those of the blends used in the tests of table I.

As chlorinated paraffin wax at 70% of Cl, there was used "Cereclor 70" (produced and marketed by I.C.I.) and as decabromodiphenyl oxide was used "FR-300" (produced and marketed by DOW CHEMICAL CO.).

The dibutyl tin maleate, added as anti-acid stabilizer, was "Irgastab T 290" (produced and marketed by CIBA-GEIGY).

It is convenient to use also the two halogenated additives (i.e. the chlorinated paraffin wax and the brominated organic compound) in the ponderal ratio of 1:1 in order to impart to the impact-resistant polymeric compositions of the invention, the best anti-flame properties (see Table III).

The tests of TABLE IV show that the addition of only the chlorinated paraffin wax or of only the brominated organic compound, is not sufficient for imparting to the compositions satisfactory levels of self-extinguishing properties.

On TABLE V have been recorded the results of the tests carried out by using, besides the chlorinated paraffin wax, the various brominated organic compounds indicated above.

In the tests of TABLES from II to V, as a representative triazine compound there were used melamine. Satisfactory results have been obtained also by using, instead of melamine, the other already mentioned triazine derivatives, as will be seen on Table VI.

It is advisable to remark that all the tests reported on Tables from II to VI have been carried out under the most severe conditions in as much as there has constantly been made use of a blend containing the maximum percentage of elastomer normally present in the impact-resistant polymeric compositions.

TABLE II

| Components | Parts by weight | | | |
|---|---|---|---|---|
| | Ex. 12 | Ex. 13 | Ex. 14 | Ex. 15 |
| Blend at 20% elastomer | 91.5 | 91 | 90.5 | 90.2 |
| (BiO)$_2$CO$_3$ | 1 | 1 | 1 | 1 |
| Melamine | — | 0.5 | 1 | 1.3 |
| Chlorinated paraffin wax at 70% of Cl | 3.5 | 3.5 | 3.5 | 3.5 |
| Decabromodiphenyl oxide | 3.5 | 3.5 | 3.5 | 3.5 |
| Dibutyl tin maleate | 0.5 | 0.5 | 0.5 | 0.5 |
| Oxygen index | 23 | 24.5 | 26 | 24.5 |

TABLE III

| Components | Parts by weight | | | | |
|---|---|---|---|---|---|
| | Ex. 16 | Ex. 17 | Ex. 18 | Ex. 19 | Ex. 20 |
| Blend at 20% elastomer | 90.5 | 90.5 | 90.5 | 90.5 | 90.5 |
| (BiO)$_2$CO$_3$ | 1 | 1 | 1 | 1 | 1 |
| Melamine | 1 | 1 | 1 | 1 | 1 |
| Chlorinated paraffin wax at 70% Cl | 6.5 | 5 | 3.5 | 2 | 6 |
| Decabromodiphenyl oxide | 0.5 | 2 | 3.5 | 5 | 1 |
| Dibutyl tin maleate | 0.5 | 0.5 | 0.5 | 0.5 | 0.5 |
| Oxygen index | 24.5 | 25.5 | 26 | 24 | 22 |

TABLE IV

| Components | Parts by weight | | | | | | | |
|---|---|---|---|---|---|---|---|---|
| | Ex. 21 | Ex. 22 | Ex. 23 | Ex. 24 | Ex. 25 | Ex. 26 | Ex. 27 | Ex. 28 |
| Blend at 20% elastomer | 90.5 | 90.5 | 90.5 | 90.5 | 90.5 | 90.5 | 90.5 | 90.5 |
| (BiO)$_2$CO$_3$ | 1 | 1 | 1 | 1 | 1 | 1 | 1 | 1 |
| Melamine | 1 | 1 | 1 | 1 | 1 | 1 | 1 | 1 |
| Chlorinated paraffin wax at 70% Cl | 7 | — | — | — | — | — | — | — |
| Decabromodiphenyl oxide | — | 7 | — | — | — | — | — | — |
| Octabromodiphenyl oxide | — | — | 7 | — | — | — | — | — |
| Pentabromodiphenyl oxide | — | — | — | 7 | — | — | — | — |
| 1.2-bis(2.4.6-tribromophenoxy)ethane | — | — | — | — | 7 | — | — | — |
| Pentabromophenol | — | — | — | — | — | 7 | — | — |
| Pentabromotoluene | — | — | — | — | — | — | 7 | — |
| Ethyl-pentabromobenzene | — | — | — | — | — | — | — | 7 |
| Dibutyl maleate | 0.5 | 0.5 | 0.5 | 0.5 | 0.5 | 0.5 | 0.5 | 0.5 |
| Oxygen Index | 21.5 | 21.5 | 22 | 23 | 22 | 24 | 23.5 | 22 |

TABLE V

| Components | Parts by weight | | | | | | |
|---|---|---|---|---|---|---|---|
| | Ex. 29 | Ex. 30 | Ex. 31 | Ex. 32 | Ex. 33 | Ex. 34 | Ex. 35 |
| Blend at 20% elastomer | 90.5 | 90.5 | 90.5 | 90.5 | 90.5 | 90.5 | 90.5 |
| (BiO)$_2$CO$_3$ | 1 | 1 | 1 | 1 | 1 | 1 | 1 |
| Melamine | 1 | 1 | 1 | 1 | 1 | 1 | 1 |
| Chlorinated paraffin wax at 70% Cl | 3.5 | 3.5 | 3.5 | 3.5 | 3.5 | 3.5 | 3.5 |
| Decabromodiphenyl oxide | 3.5 | — | — | — | — | — | — |
| Octabromodiphenyl oxide | — | 3.5 | — | — | — | — | — |
| Pentabromodiphenyl oxide | — | — | 3.5 | — | — | — | — |
| 1.2-bis(2.4.6-tribromophenoxy)ethane | — | — | — | 3.5 | — | — | — |
| Pentabromophenol | — | — | — | — | 3.5 | — | — |
| Pentabromotoluene | — | — | — | — | — | 3.5 | — |
| Ethyl-pentabromobenzene | — | — | — | — | — | — | 3.5 |
| Dibutyl tin maleate | 0.5 | 0.5 | 0.5 | 0.5 | 0.5 | 0.5 | 0.5 |
| Oxygen index | 26 | 26 | 26.5 | 25.5 | 25.5 | 25.5 | 28 |

TABLE VI

| Components | Parts by weight | | | | | |
|---|---|---|---|---|---|---|
| | Ex. 36 | Ex. 37 | Ex. 38 | Ex. 39 | Ex. 40 | Ex. 41 |
| Blend at 20% elastomer | 90.5 | 90.5 | 90.5 | 90.5 | 90.5 | 90.5 |
| (BiO)$_2$CO$_3$ | 1 | 1 | 1 | 1 | 1 | 1 |
| Chlorinated paraffin wax at 70% Cl | 3.5 | 3.5 | 3.5 | 3.5 | 3.5 | 3.5 |
| Decabromodiphenyl oxide | 3.5 | 3.5 | 3.5 | 3.5 | 3.5 | 3.5 |
| Melamine | 1 | — | — | — | — | — |
| Ammeline | — | 1 | — | — | — | — |
| Ammelide | — | — | 1 | — | — | — |
| Acetoguanamine | — | — | — | 1 | — | — |
| Benzoguanamine | — | — | — | — | 1 | — |
| Isocyanuric acid | — | — | — | — | — | 1 |
| Dibutyl tin maleate | 0.5 | 0.5 | 0.5 | 0.5 | 0.5 | 0.5 |
| Oxygen index | 26 | 25.5 | 25 | 26 | 24.5 | 24 |

The tests reported on the preceding tables were carried out using as an elastomer an ethylene-propylene saturated copolymer: analogous results are obtained when using a terpolymer of a low degree of unsaturation of ethylene with at least one alpha-olefin containing from 3 to 6 carbon atoms and at least one diene or polyene hydrocarbon, such as for instance an ethylene-propylene-diene terpolymer.

The polymeric compositions of this invention find an application in the manufacture of articles endowed with impact resistance properties and flame resistance characteristics, especially in the production of bumpers and other motorvehicles accessories.

What we claim is:
1. Impact resistant polymeric compositions endowed with flame-resistance properties, comprising as the essential components:
(1) a blend consisting of (a) 95–80% by weight of a thermoplastic propylene-ethylene block copolymer containing from 3 to 20% by weight of copolymerized ethylene and having a flow index, mea- sured at 230° C. according to ASTM D 1238 condition L standards, between 0.2 and 1, and an elasticity modulus at 23° C., measured according to ASTM D 790 standards, of at least 1100 MN/m², and (b) from 5-20% by weight of an elastomeric ethylene-propylene copolymer containing from 50 to 70% by weight of copolymerized ethylene and having a Mooney viscosity ML (1+4) at 100° C. comprised between 50 and 100;

(2) from 0.5 to 5%, preferably from 0.9 to 1.7%, of basic bismuth carbonate $(BiO)_2CO_3$;

(3) from 0.3 to 1.3% of a triazine compound selected from the group consisting of melamine, ammeline, ammelide, acetoguanamine, benzoguanamine and isocyanuric acid;

(4) from 2 to 10% of a chlorinated paraffin wax containing from 40 to 70% by weight of chlorine;

(5) from 0.5 to 10% of a brominated organic compound selected from the group consisting of decabromodiphenyl oxide, octabromodiphenyl oxide, pentabromodiphenyl oxide, 1,2-bis(2,4,6-tribromophenoxy)ethane, pentabromophenol, pentabromotoluene and ethyl-pentabromobenzene;

the total quantity of the two halogenated additives ranging from 5 to 15% and all the percentages of antiflame additives being referred to the total weight of the composition.

2. Compositions according to claim 1, in which the weight ratio of the $(BiO)_2CO_3$ to the triazine compound and of the chlorinated paraffin wax to the brominated organic compound are each 1:1.

3. Compositions according to claim 1, comprising the blend of a thermoplastic propylene-ethylene block copolymer and an elastomeric ethylene-propylene copolymer, and, in addition:

(a) 1% of basic bismuth carbonate;

(b) 1% of a triazine compound selected from the group consisting of melamine, ammeline, ammelide, acetoguanamine, benzoguanamine, and isocyanuric acid;

(c) 3.5% of a chlorinated paraffin wax at 70% by weight of chlorine; and (d) 3.5% of a brominated organic compound selected from the group consisting of decabromodiphenyl oxide, octabromodiphenyl oxide, pentabromodiphenyl oxide, 1,2-bis(2,4,6-bromophenoxy)ethane pentabromophenol, pentabromotoluene, and ethyl-pentabromobenzene;

the above indicated percentages being referred to the total weight of the composition.

4. In the manufacture of motor vehicle bumpers, the improvement comprising forming said bumpers from the composition of claim 1.

5. Impact resistant polymeric composition of claim 1 in which the basic bizmuth carbonate is present in an amount from 0.9 to 1.7%.

* * * * *

UNITED STATES PATENT AND TRADEMARK OFFICE
CERTIFICATE OF CORRECTION

PATENT NO. : 4,203,882
DATED : May 20, 1980
INVENTOR(S) : Guido Bertelli et al

It is certified that error appears in the above-identified patent and that said Letters Patent are hereby corrected as shown below:

In Col. 7, line 10, ", preferably from 0.9 to 1.7%" should be deleted.

In Col. 8, line 17, "1,2-bis(2,4,6-bromophenoxy)ethane" should read -- 1,2-bis(2,4,6-tri-bromophenoxy)ethane --.

Signed and Sealed this

Thirtieth Day of September 1980

[SEAL]

Attest:

SIDNEY A. DIAMOND

Attesting Officer

Commissioner of Patents and Trademarks